United States Patent [19]
Radzwill et al.

[11] Patent Number: 4,504,341
[45] Date of Patent: Mar. 12, 1985

[54] FABRICATING SHAPED LAMINATED TRANSPARENCIES

[75] Inventors: John E. Radzwill, Arnold; Roger F. Bartoli, Natrona Heights, both of Pa.

[73] Assignee: PPG Industries, Inc., Pittsburgh, Pa.

[21] Appl. No.: 549,051

[22] Filed: Nov. 7, 1983

Related U.S. Application Data

[63] Continuation-in-part of Ser. No. 419,876, Sep. 20, 1982, abandoned.

[51] Int. Cl.$^3$ .............................................. B32B 17/00
[52] U.S. Cl. .................................... 156/102; 156/104; 156/105; 156/106; 156/222; 156/245; 156/285; 156/286; 156/289; 156/311; 156/382; 156/498; 156/499; 244/129.3; 264/1.7; 264/2.7; 264/241; 264/553
[58] Field of Search .......................... 428/174; 52/789; 244/129.3; 264/1.7, 241, 2.7, 553; 156/87, 245, 102, 285, 104, 286, 106, 289, 222, 382, 105, 498, 311, 499

[56] References Cited

U.S. PATENT DOCUMENTS

| | | | |
|---|---|---|---|
| 2,466,735 | 4/1949 | Piazze | 156/498 |
| 3,051,054 | 8/1962 | Crandon | 156/106 |
| 3,228,330 | 1/1966 | Myers | 156/382 |
| 3,769,133 | 10/1973 | Halberschmidt et al. | 156/382 |
| 3,960,627 | 6/1976 | Halberschmidt et al. | 156/289 |
| 4,180,426 | 12/1979 | Oustin et al. | 156/286 |

Primary Examiner—John J. Gallagher
Attorney, Agent, or Firm—Andrew C. Siminerio; Edward I. Mates

[57] ABSTRACT

The present invention relates to the simultaneous shaping and lamination of lightweight laminated transparencies, particularly those that are suitable for use in aircraft. The plies of an assembly to be shaped and laminated are assembled with additional elements to form a flexible cell of air impervious material. The cell includes an air impervious flexible wall defining a peripheral space around the assembly and porous material in the space. The cell containing the assembly is mounted over a vacuum mold and heated to sag the cell and its assembly to the contour of the mold while evacuating the cell while the cell and said assembly are exposed to atmospheric pressure.

The cell is cooled while still under evacuation until the shape of the assembly is set, then is separated from the vacuum mold. The resulting assembly thus shaped and laminated is separated from the cell.

19 Claims, 5 Drawing Figures

FABRICATING SHAPED LAMINATED TRANSPARENCIES

RELATION TO OTHER APPLICATIONS

This application is a continuation-in-part of U.S. patent application Ser. No. 419,876 of John E. Radzwill and Roger F. Bartoli, filed Sept. 20, 1982, now abandoned, for FABRICATING SHAPED LAMINATED TRANSPARENCIES.

BACKGROUND OF THE INVENTION

1. Field of the Invention

The present invention relates to fabrication of lightweight aircraft transparencies, particularly those that have to be both shaped and laminated. Specifically, the present invention relates to method and apparatus for fabricating lightweight aircraft transparencies that require a minimum of expensive equipment and that consume a minimum of parts during the fabrication of such transparencies.

2. Description of the Technology and Patents of Interest

This invention relates to the fabrication of shaped, laminated lightweight plastic transparencies, particularly those comprising at least one sheet of acrylic plastic resin. The acrylic resin may be laminated to additional sheets of acrylic plastic or polycarbonate plastic to form a laminated transparency especially suitable for aircraft.

The transparencies for aircraft are required to fit within a frame and have to be shaped to fit within the frame. In addition, it is desirable for good optics that any surface of the acrylic resin sheet that forms an exterior or interior surface of an aircraft transparency be as free from surface marks as possible.

Acrylic resin is used in laminated transparencies for aircraft where glass is unsafe, too heavy, or otherwise impractical. Cast polymethyl methacrylate, which is concurrently marketed under such trademarks as PLEXIGLAS by Rohm and Hass and LUCITE by DuPont, is a typical acrylic resin that has several characteristics which make it ideally suited for aircraft transparencies, such as canopies and windows for lightweight aircraft. For example, it is considerably lighter than glass, yet is quite strong at ambient temperatures. Moreover, while acrylic resin is relatively soft compared to glass and therefore scratches more readily than glass, the scratches are easily removed merely by polishing the marred area with common polishing compounds. Furthermore, acrylic resin is fairly stable from a chemical standpoint. It is relatively unaffected by most solvents. Furthermore, acrylic resins accept ultraviolet light stabilizers without significantly impairing their light transmitting characteristics.

For the above reasons, acrylic resin and particularly cast polymethyl methacrylate, has been used as an outer layer of either monolithic or laminated cured aircraft transparencies, particularly for lightweight planes which fly at relatively low altitudes and at relatively low speeds. Under such circumstances, the acrylic windows, windshields or canopies of aircraft do not develop a temperature above the softening point of the acrylic resin, which is in the vicinity of 225° F. (107° C.).

Bent laminated transparencies for aircraft have been produced using relatively expensive equipment such as high pressure autoclaves and/or presses. Furthermore, the relatively rigid components of lightweight laminated transparencies for aircraft, such as sheets of acrylic plastic and/or polycarbonate sheets, have been preformed in a forming operation followed by assembling and laminating the preformed parts to form laminated shaped transparencies. It would be desirable to eliminate such high cost equipment, and it would also be considered an improvement in efficiency of operation if it were possible to simultaneously laminate an assembly while it is being shaped.

In laminating glass plastic assemblies, it has been customary according to one method to enclose the assembly to be laminated so that a peripheral ring formed of a split tube of flexible material clamps against the marginal portion of the top and bottom surfaces of the assembly to form a peripheral evacuating chamber. The evacuating chamber is connected to a source of vacuum so as to remove air and other fluids entrapped at the interfaces between the components of the assembly to be laminated. The assemblies are heated to help bond the components at least preliminarily prior to a final laminating step in an expensive autoclave. While such prepressing is suitable for laminating glass to plastic interlayer materials, when a lower softening point material such as acrylic plastic or polycarbonate plastic is used instead of the glass sheets in the assembly to be laminated, the compressive force of the lips of the evacuating ring causes the relatively rigid outer plies of polycarbonate or plastic to become distorted and develop a frame of optical distortion. Such a frame is undesirable.

Other laminating techniques involve the use of flexible bags within which the elements are assembled and laminated. The flexible laminating bags must be destroyed after one laminating cycle in order to remove the laminated assembly after the assembly has been subjected to elevated pressure and temperature while within the evacuated and sealed laminating bag, so that it is impractical to use the laminating bags more than once. Furthermore, such laminating bags are expensive, and it would be desirable to develop a method that avoids such laminating bags. In addition, it is impossible to evacuate such laminating bags completely so that some residual air remains entrapped therewithin after a laminating operation is ended. Removal of this residual entrapped air remained a problem at the time of this invention.

Various patents disclose the state of the art and will now be described.

U.S. Pat. No. 2,142,445 to Helwig shapes a sheet of thermoplastic material against a concave mold cavity by applying hot liquid under pressure against a surface of a clamped sheet to stretch the sheet against the concave mold cavity and chilling the sheet as it approaches the cavity. The shaping is confined to a monolithic sheet and no laminating is involved.

U.S. Pat. No. 2,948,645 to Keim discloses the use of a peripheral evacuation chamber to remove fluid from between the interfacial surfaces of an assembly containing a pair of glass sheets on opposite sides of a flexible sheet of interlayer material during the preliminary stage of a laminating operation. The lips of the peripheral evacuation chamber are stressed to impart a clamping pressure about the perimeter of the assembly to be laminated. This clamping pressure causes the interlayer to extrude from the margin of the assembly to form a frame of optical distortion that is undesirable in aircraft transparencies. Therefore, the peripheral chamber is removed before the final lamination in an autoclave.

Other patents showing similar peripheral evacuation means during a glass sheet lamination operation include U.S. Pat. No. 2,992,953 to Talburtt, U.S. Pat. No. 3,074,466 to Little, U.S. Pat. No. 4,281,296 to Jameson and U.S. Pat. No. 3,508,996 to Hill. A peripheral evacuation technique using a tight gas seal tightly secured to the edge of the assembly during the laminating of polymethyl methacrylate is shown in U.S. Pat. No. 3,284,263 to Jamet. U.S. Pat. No. 3,912,542 to Hirano et al. uses peripheral evacuation and heat to laminate glass sheets to a synthetic resin in an assembly covered by a flexible diaphragm clamped to a support for said assembly. There is no sheet of interlayer in the assembly to be laminated or shaping of the assembly during its lamination in Hirano et al.

U.S. Pat. No. 3,769,133 to Halberschmidt et al. inserts an assembly to be laminated within a flexible bag, the bag is inserted within a chamber in communication with the chamber, the chamber and bag are evacuated to degas the assembly, the bag is sealed while the chamber is at low pressure and then the sealed bag and its contents are exposed to an elevated pressure and temperature to laminate the assembly within the bag. No shaping takes place during the laminating operation and superatmospheric pressure is used to complete the lamination. This requires expensive equipment for elevated pressure application.

U.S. Pat. No. 3,852,136 to Plumat et al. applies a peripheral evacuation tube around the periphery of a plurality of assemblies that are laminated in unison within a chamber or a series of chambers in which the pressure cycle differs from the evacuation pressure applied to the interfacial surfaces of the assemblies through the peripheries of the latter. No shaping is involved with the laminating technique of this patent and superatmospheric pressure is applied.

U.S. Pat. No. 4,180,426 to Oustin et al. evacuates an assembly to be laminated while the assembly is enclosed in a sack and the sack enclosed within a chamber, where pressure and temperature are subjected to a cycle suitable for laminating. No shaping is involved in the laminating process.

U.S. Pat. No. 4,231,827 to Wilson et al. sag bends individual or fused sheets to be laminated to approximate shape and then assembles the sag bent sheets over a flexible blanket of polyurethane foam or felt resting over a vacuum type mold, and a flexible diaphragm is applied over the sag bent sheet and the vacuum mold to form the roof of an evacuating chamber around the assembly. The polyurethane foam blanket separates the sheets to be shaped from direct contact with any imperfections in the shaping surface of the vacuum mold. After vacuum forming the layers of the assembly to preliminary shape, the shaped acrylic layers are assembled with interlayers between shaped polycarbonate pressing plates to form a laminating assembly, and the latter is taped and inserted in a flexible laminating bag. The latter is evacuated and sealed and the assembly within the bag between the pressing plates is laminated in an autoclave. The shaping and laminating steps are consecutive, not simultaneous, and the process requires an expensive autoclave.

U.S. Pat. No. 4,287,015 to Danner forms a vacuum bag by applying a flexible sheet of stretchable material over and beyond raised ribbing surrounding an assembly to be laminated to encase the assembly in a vacuum bag. Reusable fastening means is provided to attach the flexible sheet to a support base beyond the ribbing. The bag is evacuated and the assembly within the bag is laminated but not changed in shape.

The art of fabricating lightweight aircraft transparencies at the time of the present invention was in need of low cost apparatus and a relatively low cost operation involving the use of reusable materials that would simultaneously laminate and shape the components of an assembly to be fabricated into a lightweight laminated transparency for aircraft.

SUMMARY OF THE INVENTION

According to the present invention, the elements of an assembly to be laminated to form a lightweight laminated transparency suitable for use in aircraft are first assembled with other flexible elements as part of a cell. The cell may rest on a base of flexible foam material softer than acrylic or polycarbonate such as polyurethane foam. The floor of the cell is a layer of a composition having the property of serving as an air impervious parting material against acrylic plastic, such as a thin sheet of silicone or a flexible sheet of rubber, having smooth surfaces. A flexible ring of air impervious material at least as high as the total thickness of the elements to be laminated is applied in air-tight relation to the perimeter of the upper surface of the sheet of parting material to form a cell wall that surrounds the assembly of elements in space relation thereto.

The elements to be laminated are assembled in a desired stacked array and temporarily taped together by a small piece of tape at each side to form a taped assembly. The latter is mounted above the parting material which, with the optional base of foam, extends beyond the outline of the assembly to be laminated. The space between the wall of the cell and the taped assembly is filled with a packing of porous material that does not adhere to the elements of the assembly to be laminated under conditions of exposure during the method to be described of simultaneously laminating and shaping the elements of the assembly.

At least one aperture extends through the wall of the cell. A pipe extends from said aperture and outward from the cell to communicate the interfaces of the assembly through the packing of porous material with a source of vacuum. Only a small portion of the assembly is taped to minimize interference with the path of evacuation. A flexible diaphragm or sheet of air impervious material that does not harm or react chemically with acrylic or polycarbonate plastic is applied to the upper surface of said assembly and over said packing and is in air-tight relation to the upper surface of the air impervious wall to form the roof of an air-tight, flexible cell. When the non-porous cell so formed is evacuated through the pipe in the air impervious wall, the cell of the elements just described becomes a unitary structure which is held together by atmospheric pressure.

The cell so formed is then laid over the upper facing surface of a vacuum mold having at least one vacuum port so that the cell, or the foam base on which the cell rests, if a foam base is used, is in facing relation to the vacuum port. In a first embodiment of this invention, a second flexible diaphragm of air impervious material is superimposed over the first flexible diaphragm of the cell and extends therebeyond to a peripheral portion that is bonded to the upper surface of the vacuum mold. The cell is heated to an elevated temperature. A collapsible chamber formed by the second flexible diaphragm and the mold that surrounds the cell is also evacuated through the vacuum port during the latter stages of the cell heating step. Preferably, a weaker vacuum is applied to the chamber formed by the second diaphragm and the mold than the vacuum to which the cell interior is subjected through the air impervious wall.

The cell and the vacuum mold and the second flexible diaphragm are subjected to heat at a temperature at which the acrylic plastic sags but below which the elements of the assembly deteriorate so that the elements of the assembly to be laminated and shaped simultaneously become exposed to a temperature at which the relatively rigid transparent sheets to be laminated sag by gravity at a pressure that does not exceed approximately atmospheric pressure. The vacuum applied to the chamber between the vacuum mold and the second flexible diaphragm enables atmospheric pressure to assist the sagging of the evacuated cell toward the shaping surface of the vacuum mold when the latter is evacuated during the latter stages of shaping.

After the cell has conformed to the shape of the vacuum mold, the temperature is reduced until the shape of the assembly which is now laminated is set, the mold vacuum is discharged, the second flexible diaphragm is removed, the cell is separated from the mold, the other vacuum source is disconnected from the cell, and the bent, laminated transparency formed from the original assembly is separated from the rest of the cell and untaped to provide the bent, laminated transparency desired. Further fabrication steps, if needed, such as cutting and routing, and drilling holes to receive attachment bolts therethrough for engagement by bolt receiving holes in the aircraft fuselage to which the lightweight laminated aircraft transparency is to be installed, may be used on the bent, laminated transparency.

According to one embodiment of this invention, the assembly to be shaped and laminated simultaneously is heated within a furnace. According to another embodiment, a fluid having high heat transfer properties is heated and recirculated through upper and lower mold chambers separated by the cell. Upper and lower flexible rubber sheets of the cell extend beyond the major surfaces of the assembly and sandwich the flexible ring that surrounds the assembly in spaced relation to its margin. The rubber sheets thus protect the assembly from direct physical contact with the heating fluid, but enable the assembly to be in heat-exchanging relation with the hot fluid during the heating step. After heating the assembly to an elevated temperature corresponding to the deformation temperature of the assembly by heat exchange between the assembly and the heating fluid. The lower mold chamber between the lower rubber sheet and the shaping surface of the apertured vacuum mold is evacuated through an aperture at the bottom of the vacuum mold while heating fluid continues to circulate through the upper mold chamber that encloses the upper rubber sheet. The upper mold chamber has a peripheral flange which is clamped to a corresponding peripheral ledge of the vacuum mold aligned with the flange to secure the flexible, stretchable rubber sheets and the flexible ring therebetween to facilitate clamping the peripheral flange to the peripheral ledge and make the cell air-impervious.

The combination of heat and evacuation of the lower chamber helps sag the assembly and the lower flexible, stretchable, rubber sheet toward the upwardly facing shaping surface of the vacuum mold. After shaping is completed, cooling fluid replaces heating fluid in the upper chamber to cool the shaped assembly while the latter is still clamped around its edge between the flange and the ledge. When the shape of the cooled assembly has set, the flange and ledge are unclamped, the shaped, laminated assembly is removed from the vacuum mold and mounted on a shaped cutting template where it is cut to a desired outline, and subjected to further processing as in the first embodiment.

The simultaneous lamination and shaping of an assembly may be accomplished in shorter time using recirculating heating fluid as in the second embodiment rather than a heating oven as is used in the first embodiment. Furthermore, circulating heating fluids in heat exchanging relation with the assembly accomplishes more uniform heating of an assembly more readily than a heating oven. Nevertheless, both techniques of heating have been used successfully to shape and laminate the components of an assembly to form a lightweight laminated transparency for aircraft.

The method performed according to the present invention utilizes a minimum of high cost apparatus such as presses or autoclaves because the simultaneous lamination and shaping takes place at a pressure that does not exceed approximately atmospheric pressure. Most of the additional cell components, the evacuating means and the vacuum mold needed for this invention are reusable. Only relatively inexpensive materials, such as the flexible diaphragms of the first embodiment, require replacement for each part to be produced. These and other benefits of the present invention will be understood more fully in the light of a description of a specific embodiment of this invention which follows.

BRIEF DESCRIPTION OF THE DRAWING

In the drawings that form part of the description of the specific embodiment of the present invention.

DESCRIPTION OF A FIRST EMBODIMENT

Figure 1:
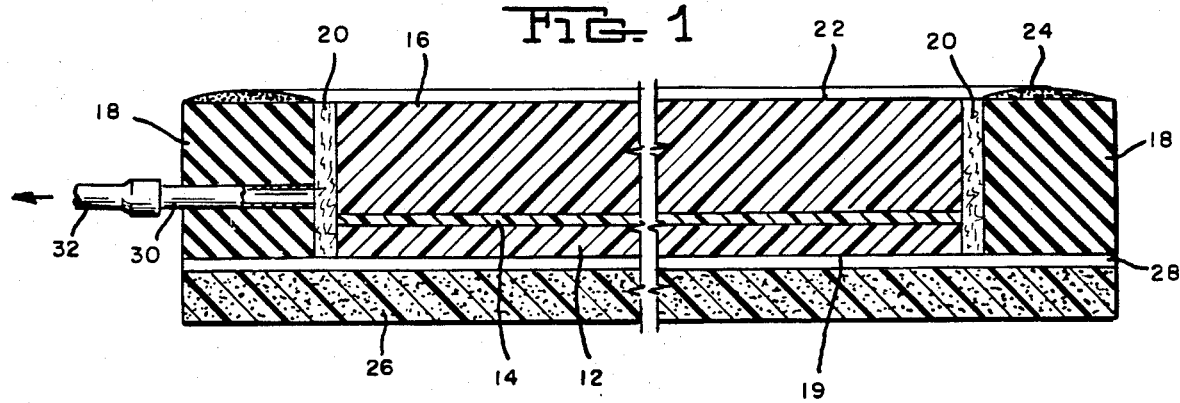
FIG. 1 is an enlarged fragmentary view of a cell incorporating an assembly of flat layers to be simultaneously shaped and laminated.

Referring to the drawings, FIG. 1 shows how an assembly to be laminated is assembled within a cell preparatory to simultaneous shaping and laminating. The elements of the assembly to be laminated include an outer ply of relatively rigid transparent material 12, a ply 14 of interlayer material and an inner ply of relatively rigid transparent material 16. The outer ply 12 is usually composed of an acrylic plastic such as polymethyl methacrylate. In a particular arrangement, the outer acrylic ply 12 is approximately 90 mils (2.29 mm) thick having wire (not shown) embedded within the thickness. The outer ply may be made by fuse bonding two plies together after sewing wire into at least one surface layer of one of said plies and using the wired surface as an interfacial surface of the fused ply. A typical fused outer ply may be fabricated in the manner depicted in U.S. Pat. No. 4,128,448 to Bitterice and Keslar, the details of which are incorporated herein by reference. The interlayer sheet 14 is a sheet of polyvinyl butyral plasticized with 21 parts of dibutyl sebacate for 100 parts of resin 50 mils (1.27 mm) thick. An inner ply 16 of stretched acrylic 312 mils (7.93 mm) thick completes the assembly. If desired, the inner ply may be only ¼ inch (6.35 mm) thick and may comprise a sheet of polycarbonate plastic coated with a suitable protective coating of a hard polyurethane on its exposed surface.

It is understood that the specific dimensions and materials specified are for illustration only. Variations are not excluded from the present invention.

The more rigid plies 12 and 16 are primed on one major surface with a suitable primer, such as a hydrolyzed tetraethyl orthosilicate composition. Then, the plies are stacked in superposed relation with the outer ply 12 having its primed major surface facing upwardly toward the lower major surface of interlayer ply 14 and the inner acrylic or polycarbonate ply 16 having its primed major surface facing downwardly toward the upper major surface of interlayer ply 14. A thin strip of adhesive tape (not shown) is applied to each side of the assembly that results to hold the assembly elements together in such a manner that almost the entire edge of the assembly remains exposed.

Other primers are more suitable for assemblies of acrylic plastic with polyurethane interlayers. For example, U.S. Pat. No. 4,177,099 to John Radzwill, the disclosure of which is incorporated herein by reference, describes the use of a primer comprising small particles of polyurethane in chloroform as a primer for bonding acrylic plastic to a polyurethane interlayer.

A cell comprising a flexible, air impervious peripheral rubber wall 18 surrounds the assembly in spaced relation thereto. Porous fiber glass cloth filler 20 may be used within the space between the assembly of plies 12, 14 and 16 to be laminated and the peripheral rubber wall 18. A first thin, flexible, air impervious diaphragm 22 of polyvinyl fluoride, commercially available under the trademark TEDLAR in thickness of 1 to 3 mils (0.25 to 0.076 mm) is adhered to the upper surface of the rubber wall 18 and stretches over the upper surface of the inner ply 16 of the assembly to be laminated to form the roof of the cell. An adhesive of plastic sealer tape 24 such as available as PRESSTITE No. 579.6, sold by ATACS, Inc., Long Beach, Calf., is used to adhere the first polyvinyl fluoride diaphragm 22 to the upper surface of the solid rubber wall 18.

The peripheral wall 18 has a height equal to the combined thickness of the plies forming the assembly 12, 14, and 16 to be laminated. Hence, when the first diaphragm 22 is applied to the sealer tape 24 atop the rubber wall 18, it is stretched in contact against the upper surface of inner ply 16.

The base of the flexible cell of the first embodiment comprises a polyurethane foam blanket 26 approximately ½ inch (12.7 mm) thick covered with a thin film 28 about 1 to 3 mils (0.025 to 0.08 mm) thick of smoothly surfaced, air impervious, flexible parting material, such as a high molecular weight siloxane sold as SYLGARD 184, a vinyl terminated dimethyl siloxane of high molecular weight formed with a catalyst having a low molecular weight dimethyl siloxane hydride and a chloroplatinic acid curing agent, supplied by Dow Corning. The parting material film 28 is bonded against the polyurethane foam blanket 26. The rubber wall 18 is bonded to the upper surface of the siloxane parting film 28 by a suitable adhesive such as General Electric 108, an acetoxy blocked dimethyl siloxane of high molecular weight. If desired, a rubber sheet approximately 40 mils (1 mm) thick can be used as a parting material instead of the dimethyl siloxane, particularly when stretched arcylic is the outer sheet applied thereagainst. In such a case, the polyurethane foam blanket 26 may be omitted.

The siloxane parting material film 28 is bonded to the upper surface of the blanket 26 of polyurethane foam to form the base of the cell enclosure that surrounds the assembly to be shaped and laminated. The unitary structure of blanket and parting material is previously formed by casting the vinyl terminated dimethyl siloxane which forms the parting material film 28 onto a sheet of glass and applying the polyurethane foam blanket 26 over the resulting film of the siloxane. The siloxane cures at room temperature, but curing can be accelerated and bonding completed if the glass sheet containing the film of silicone and the polyurethane foam blanket is inserted in an oven at 130° F. (54° C.) for 2 hours. The unitary structure of blanket 26 and parting material film 28 is separated from the glass sheet. The rubber wall 18 is then adhered to the perimeter of the exposed surface of the parting material film 28 using as adhesive GE#108, described earlier, so that the taped assembly of plies 12, 14 and 16 may be stacked atop the parting material film 28 of the flexible cell base in spaced relation within the peripheral wall 18.

A hole through the wall 18 receives a metal tube 30 to which is attached a rubber hose 32. The latter is adapted to be coupled to a vacuum source (not shown) and holds the components of the flexible cell containing the assembly to be laminated by atmospheric pressure when the vacuum source is applied. The cell ready for treatment in a vacuum mold is shown assembled in FIG. 1.

The cell of FIG. 1 is mounted as a unitary flexible structure held together by vacuum on a vacuum mold 33 having an upper shaping surface of concave configuration conforming to the shape desired for the outer ply 12 of the assembly to be laminated to form an aircraft transparency. The vacuum mold 33 is composed of metal or fiber glass reinforced epoxy resin. The polyurethane foam blanket 26 of the cell is mounted in facing relation to the shaping surface of the vacuum mold 33. A second thin diaphragm 34 larger than the outline of the cell, but of approximately the same thickness of polyvinyl fluoride as diaphragm 22, is applied over the cell and around the rubber hose 32 that forms the vacuum passage from the interior of the cell. Additional adhesive 36 similar to adhesive 24 is provided on the upper surface of the vacuum mold 33 to bond the second flexible diaphragm 34 to the vacuum mold 33 and encloses the cell of FIG. 1 within a vacuum chamber formed by the vacuum mold 33 and the second flexible diaphragm 34 with the adhesive 36 holding the second diaphragm 34 in air tight relation against the vacuum mold 33.

The vacuum mold 33 is provided with a vacuum port 38 that faces the cell. An exhaust tube 40 communicates port 38 to a second source of vacuum. This latter vacuum is applied to the chamber that surrounds the cell.

Figure 2:
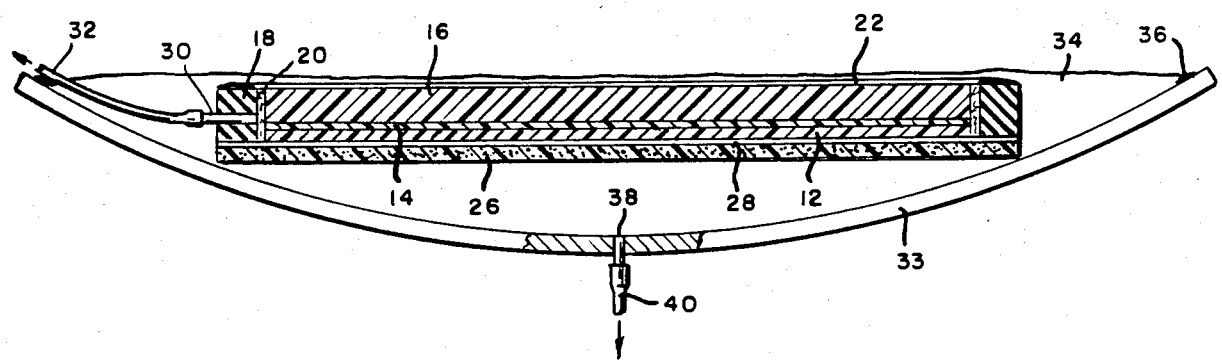
FIG. 2 is a cross-sectional view of a smaller scale than FIG. 1 showing how the cell of FIG. 1 is mounted for shaping on a vacuum type mold for simultaneous shaping and lamination of the assembly.

It will be noted from a study of FIGS. 1 and 2 that the outline of the rubber wall 18 is approximately equal to the respective outlines of the siloxane parting film 28 and the polyurethane foam blanket 26. Thus, when vacuum is applied from a vacuum source through the rubber hose 32 and the metal tube 30, any air within the cell including the interfaces between the plies 12, 14 and 1 to be laminated is sucked out of the cell and the plies 12, 14 and 16 are held together in very intimate contact.

The polyurethane foam blanket 26 protects the assembly of plies 12, 14 and 16 to be laminated, particularly the bottom surface of the outer ply 12, against direct contact with the upper surface of the vacuum mold 33, which may be rough. The smooth surface of the parting material film 28 protects the otherwise exposed surface of the outer acrylic ply 12 from replicating the foam configuration of the supporting surface of the polyurethane foam blanket 26.

The cell enclosing the assembly of plies 12, 14 and 16, which comprises the rubber peripheral wall 18, the fiber glass packing 20, the parting material film 28, the polyurethane foam blanket 26 and the first diaphragm 22, is subjected to vacuum so as to suck the first diaphragm 22 against the upper surface of the assembly, wall 18 and packing 20, and causes the entire cell to be a unitary structure. When the evacuated cell is located in sag bending relation upon the vacuum mold 33 while vacuum is applied to the cell, the second diaphragm 34 extending beyond the dimensions of the cell is adhered to the vacuum mold 33, using the Presstite tape 36 which is applied in a manner similar to adhesive tape 24. The Presstite tape used for adhesives 24 and 36 is a tacky, non-curing adhesive material that is furnished in the form of a tape ½ inch (12.7 mm) wide and ⅛ inch (3.2 mm) thick. The vacuum mold 33 is preferably formed of a high temperature epoxy resin. The second diaphragm 34 is stretched over the cell and bonded to the adhesive 36 applied to the upper surface of the vacuum mold 33 in spaced relation to the perimeter of the cell. The assembly of cell and vacuum mold containing the cell is then placed into a hot air circulating oven. The oven is heated to a high temperature of approximately 210° F.±10° F. (99° C.±6° C.) for approximately 4 hours, at least the first two hours of which is performed without applying vacuum to the vacuum mold 33. For at least the last 30 minutes of this exposure to high temperatures, a vacuum pressure of 5 to 10 inches (125 to 254 mm) of mercury is applied to the chamber exterior of the cell through the vacuum port 38. This latter vacuum causes the latter chamber to collapse about the cell. Throughout the heating step, a higher vacuum on the order of approximately 28 to 29 inches (711 to 737 mm) of mercury is applied simultaneously through the metal tube 30 and the rubber hose 32 to the cell.

As a result of the heating treatment previously described, the cell sags to conform to the shape of the upward facing surface of the vacuum mold 33. The first diaphragm 22 is tightened against the cell due to the application of relatively strong vacuum to the cell, and the cell obtains the shape of the vacuum mold 33 due to the application of lesser vacuum to the mold chamber surrounding the cell augmented by atmospheric pressure on the cell. The plastic transparency comprising plies 12, 14 and 16 is thus simultaneously formed and laminated.

The cell and its contents are then cooled to room temperature while the cell is still under the cell vacuum to set the shape of the assembly, which has been laminated and simultaneously shaped. The mold vacuum is discontinued. The cooled cell is removed from the vacuum mold. The vacuum source to the cell may be discontinued either before or after removing the cool cell from the vacuum mold. The simultaneously laminated and formed transparency 12, 14 and 16 is then removed from the cell which is ready for reuse. The base of the cell, including blanket 26 and parting material film 28, and the flexible wall 18 of the cell, resume a flat configuration after the shaped, laminated transparency is removed. The only materials that need to be replaced for another shaping operation are the thin diaphragms and some of the fiber glass packing for the filler 20.

Twenty test transparencies were fabricated, some fabricated with deficient material, using the cell forming technique of the present invention. These were inspected for acceptance based on customer requirements. All of the test laminates met the requirements for shape based on tolerances permitted by customers. Optical properties were checked by viewing a lighted grid board of criss-crossing strings through the fabricated laminated transparency at an oblique angle at which the transparency is expected to be installed. The transparencies viewed in this manner were deemed to have passed this test except for the defects that were present in the material at the start of the fabrication test.

Another test performed on one of the laminated transparencies involved heating the latter to 160° F. (71° C.), maintaining the tested transparency at that temperature for 2 hours, cooling it to room temperature of about 70° F. (21° C.), reheating to 160° F. (71° C.), maintaining that temperature for 4 hours, cooling to room temperature, reheating to 160° F. (71° C.), maintaining the high temperature for 6 hours, cooling to room temperature and finally heating to and maintaining a temperature of 160° F. (71° C.) for 100 hours before cooling to room temperature. The tested laminated transparency was inspected for the presence of bubbles and delamination after each cooling and no such defects were observed. This test was more severe than standard production testing which involves a maximum of about 6 hours of heating at 160° F. 71° C.).

As a further precaution to insure that the lamination was successful, the tested laminated transparency was heated and maintained at an elevated temperature of 180° F. (82° C.) for two hours and inspected for bubbles and delamination after said heat treatment followed by cooling to room temperature. No defect of either type was observed after this treatment.

The results of these tests indicated the cell method succeeded in simultaneously shaping and laminating laminated acrylic transparencies. Different thicknesses of plies are laminated and shaped simultaneously at the saem approximate temperature range of 200°–200° F. (44°–105° C.) for different time periods. Generally, longer time is needed for conforming thicker assemblies than thinner assemblies.

Prior to the successful simultaneous shaping and laminating of laminated acrylic transparencies by the cell method of the present invention, the 90 degree NASA peel test was used to compare the adhesion of flat sheets of acrylic plastic to interlayer sheets of polyvinyl butyral plasticized with 37.5 parts by weight of dibutyl sebacate to 100 parts of interlayer and others with interlayer sheets plasticized with 21 parts by weight of dibutyl sebacate per 100 parts of interlayer when laminated by the cell method of the present invention (omitting only the simultaneous shaping step) compared to the prior art technique of laminating identical assemblies involving using an autoclave.

The test assemblies compared for adhesive properties contained the same assembly arrangement and the same primer. Thos representing the prior art were inserted in a sealed, evacuated laminating bag of the type disclosed in U.S. Pat. No. 3,311,517 of Leroy D. Keslar and John S. Rankin while those representing the present invention were contained in an evacuated flat cell of the type depicted in FIG. 1. Each tested assembly was 12 inches (30 cm) square containing adjacent plies of acrylic plastic and the aforesaid plasticized polyvinyl butyral with a strip 2 inches (5 cm) wide of parting material applied along one edge in one direction and narrower strips of parting material 1 inch (2.5 cm) wide separated by 1 inch (2.5 cm) were applied in a direction normal to the first direction, and a rigid backup sheet having a coating of parting material applied in facing relation to the opposite side of the interlayer. After the prior art specimens were laminated at a temperature of 215° F. (102° C.) for 60 minutes at a pressure of 200 pounds per square inch (14 kilograms per square centimeter) and those speciments representing the present invention were heated for 4 hours in an evacuated, air impervious cell, each specimen was cut into 6 strips of a laminate in the areas between the narrower strips. The resulting test strips were each 12 inches (30 cm) long and one inch (2.5 cm) wide with a 2 inch (5 cm) long tab of polyvinyl butyral separated from the acrylic plastic. An Instron test machine held the laminated portions of the strip tested between free running rolls and pulled the tab normal to the interfacial surface between the plies of the strip. A recorder indicated the pull force required to separate the polyvinyl butyral beyond the tab from the remainder of the acrylic plastic to which it was bonded by lamination.

ALTERNATE EMBODIMENT

Figure 4:
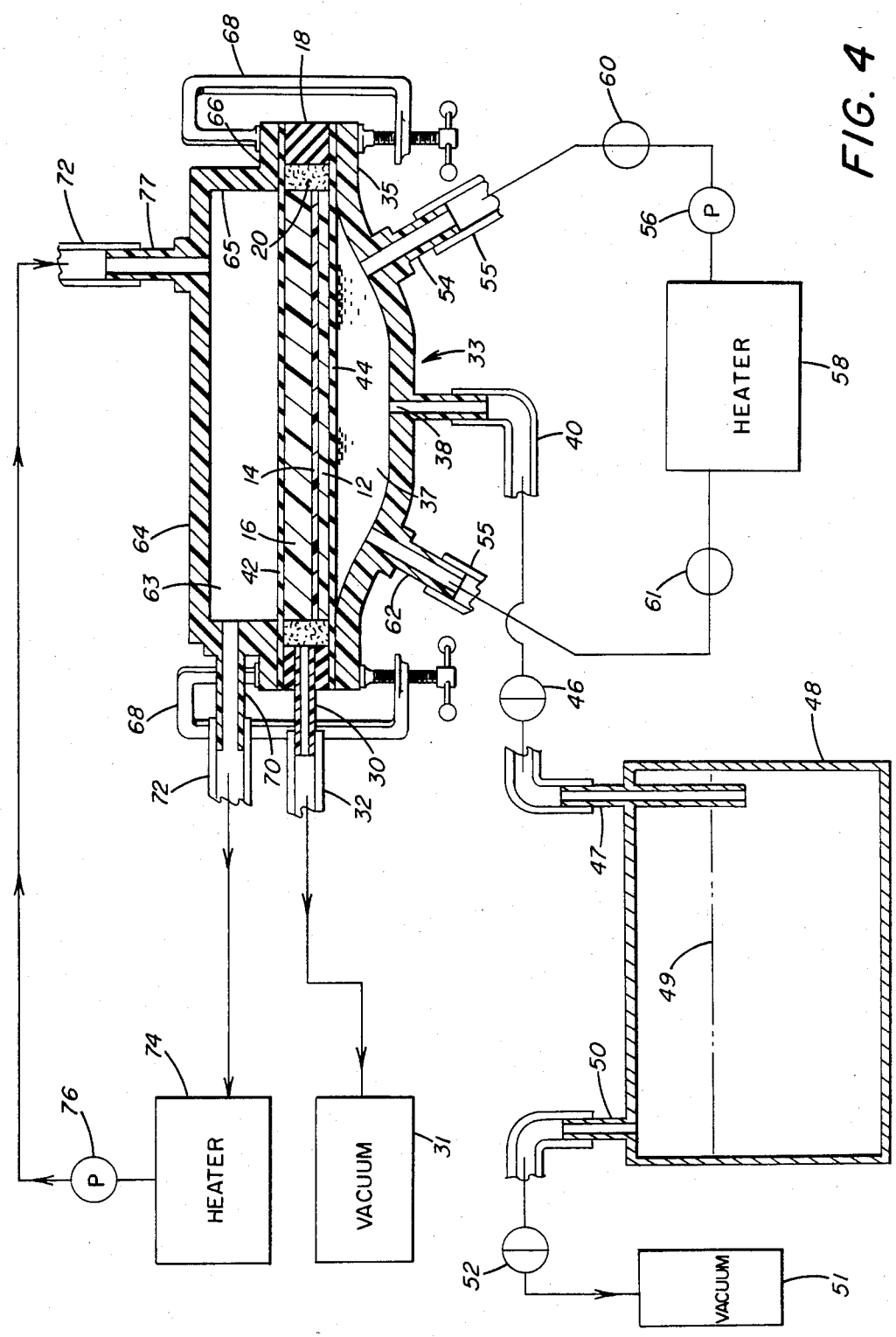
FIG. 4 is a schematic view of an assembly of flat layers arranged according to a second embodiment of the present invention to form a cell at the start of a simultaneous shaping and laminating operation in which the assembly is heated by circulating hot heating fluid in heat exchanging relation with the assembly.
Figure 5:
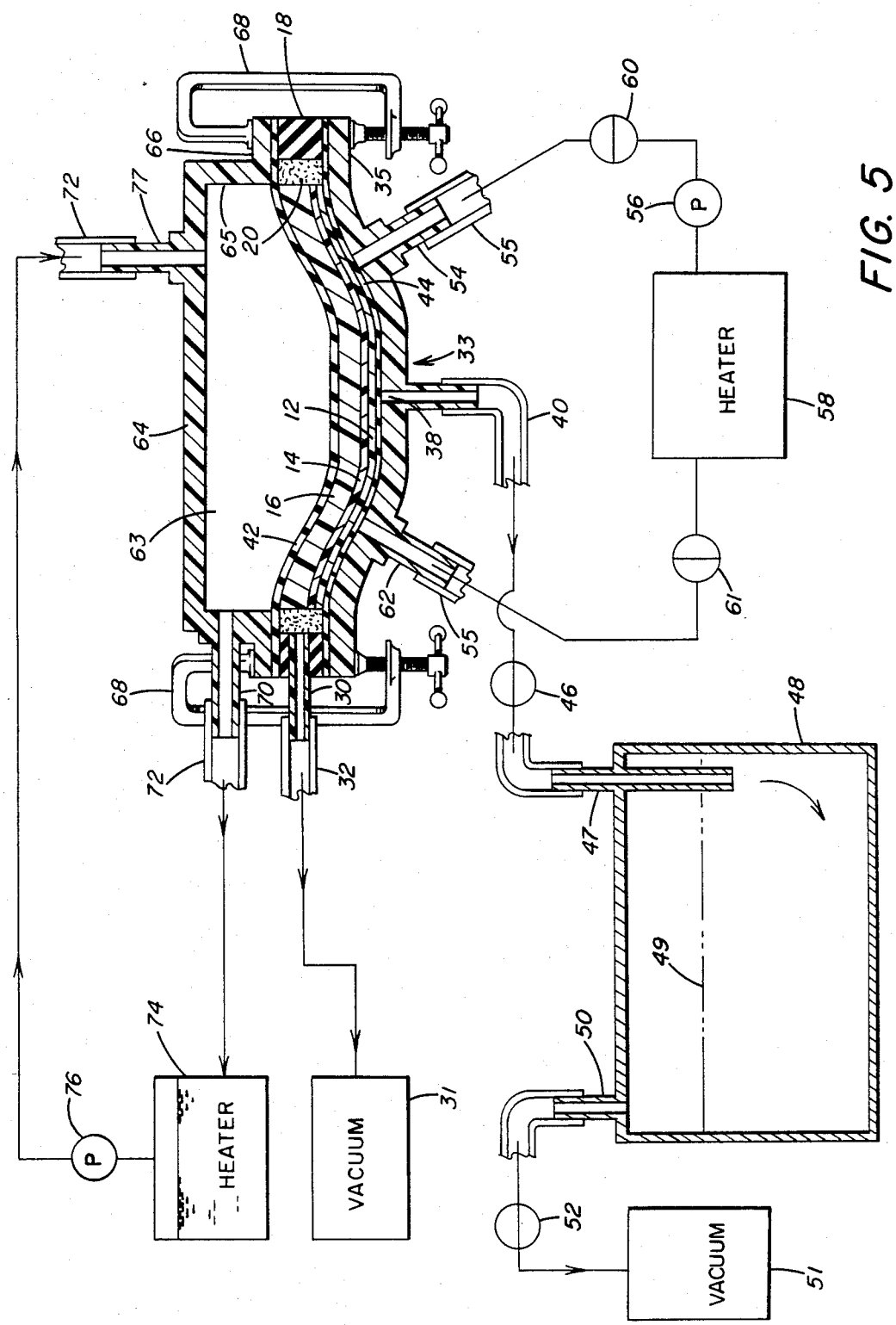
FIG. 5 is a schematic view similar to that of FIG. 4, showing the arrangement of the cell of FIG. 4 after the simultaneous shaping and laminating operation is completed.

FIGS. 4 and 5 illustrate an alternate embodiment of the invention that recirculates heating fluid in heat exchange relationship with an assembly to be simultaneously shaped and laminated instead of heating the assembly within a heating oven. The alternate embodiment avoids the need for an expensive oven and provides a more rapid and more uniform heat pattern throughout the extent of the assembly.

In the alternate embodiment, an assembly of an outer rigid transparent sheet 12 of plastic material, a flexible sheet of interlayer material 14, and an inner rigid transparent sheet 16 of plastic material is assembled and partially taped as the assembly of the first embodiment. The taped assembly is sandwiched between an upper sheet of silicone rubber 42 and a lower sheet of silicone rubber 44. The sheets 42 and 44 of silicone rubber are smoothly surfaced, have an approximate thickness of 60 mils (1.5 millimeters) and extend beyond the outline of the assembly on all sides of the latter. A peripheral rubber wall 18 surrounds the periphery of the assembly in spaced relation thereto and a porous fiber glass cloth filler 20 may fill the space between the assembly of plies 12, 14 and 16 to be laminated and the peripheral rubber wall 18 as in the first embodiment. The extended marginal portions of the sheets 42 and 44 sandwich the peripheral rubber wall 18 therebetween. The assembly forms an air impervious cell within the sheets 42 and 44 and the peripheral rubber wall 18.

Also, as in the first embodiment, the height of the peripheral rubber wall 18 equals the combined thickness of the plies 12, 14 and 16 to be laminated. A hole in the wall 18 receives a metal tube 30 which communicates with a vacuum source 31 through a rubber hose 32.

In the second embodiment, the mold 33 has a peripheral ledge 35 that extends outwardly from the shaping surface of the mold and also comprises a vacuum port 38 at the lowest portion of its shaping surface and an exhaust tube 40. The latter extends outwardly from the vacuum port 38 and communicates through a mold exhaust valve 46 and a fluid inlet tube 47 into a fluid storage tank 48. The inlet tube 47 extends downward to a level below the surface of a supply of a high heat capacity fluid 49 in the fluid storage tank 48. A suction tube 50 extends through the roof of the fluid storage tank 48 and communicates the atmosphere over the fluid within the fluid storage tank 48 with a vacuum source 51 through a storage tank control valve 52.

The mold 33 also includes a lower mold chamber exit pipe 54 that removes hot fluid from a lower mold chamber 37 formed between the lower sheet of silicone rubber 44 and the mold 33 and helps circulate the removed fluid through a supply hose 55 of a fluid circulating system that comprises a pump 56, a heater 58, a valve 60, a safety valve 61, if desired, and an entry pipe 62. Hot fluid in the lower mold chamber is recirculated through the fluid circulating system just described and reheated before its return to lower mold chamber 37.

The shaping and laminating apparatus of the second embodiment also comprises an upper mold chamber 63 that comprises an upper chamber wall 64, a peripheral wall 65 and an outwardly extending peripheral flange 66. Clamps 68, preferably of the C-shaped type, secure the peripheral flange 66 to the peripheral ledge 35 of the mold 33 to insure that both the lower mold chamber 37 and the upper mold chamber 63 are air tight.

The apparatus also comprises a hot fluid circulation system for the upper mold chamber 63 that comprises an upper mold chamber exit pipe 70 extending through the peripheral wall 65, a fluid supply hose 72 of a fluid circulating system that brings fluid through a heater 74 and a pump 76 to an upper mold chamber fluid feed pipe 77. The apparatus is ready to operate when the plies 12, 14 and 16 are assembled between the silicone rubber sheets 42 and 44 and assembled with the fiber glass cloth filler 20 and the peripheral rubber wall 18 to form a cell, the cell is mounted on the peripheral ledge 35 of the mold 33 and the upper chamber 63 mounted over the mold 33 with peripheral flange 66 over peripheral ledge 35. After the latter two are clamped together, the various valves are arranged with mold exhaust valve 46 closed and valve 60 and safety valve 61 open as depicted in FIG. 4 and the heaters are started to begin a flow of hot fluid in both the lower chamber 37 and in the upper chamber 63.

When the heated fluid has circulated at a desired elevated temperature for sufficient time, the assembly of plies 12, 14 and 16 softens and valve 60 and safety valve 61 are closed and mold exhaust valve 46 opened with the vacuum source 51 actuated to remove the hot fluid from lower mold chamber 37, leaving a partial vacuum in the collapsible lower mold chamber. Hot fluid continues to circulate in the upper mold chamber 63, which enlarge as the collapsible lower mold chamber 37 collapses and the pressure difference between the upper mold chamber and the collapsible lower mold chamber forces the cell to assume the shape of the vacuum mold 33.

Clamps 68 continue to engage peripheral flange 66 against peripheral ledge 35 to retain an air tight volume within the peripheral rubber wall 18. The silicone rubber sheets 42 and 44 stretch between their clamped ends to conform to the sagged shaped of the assembly of 5 layers 12, 14 and 16 as the assembly conforms to the shape of the upwardly facing surface of the vacuum mold 33. The presence of the lower silicone rubber sheet 44 between the mold 33 and the outer surface of ply 12 prevents replication of any irregularities in the upper surface of the vacuum mold 33 on the outer surface of ply 12.

Figure 3:
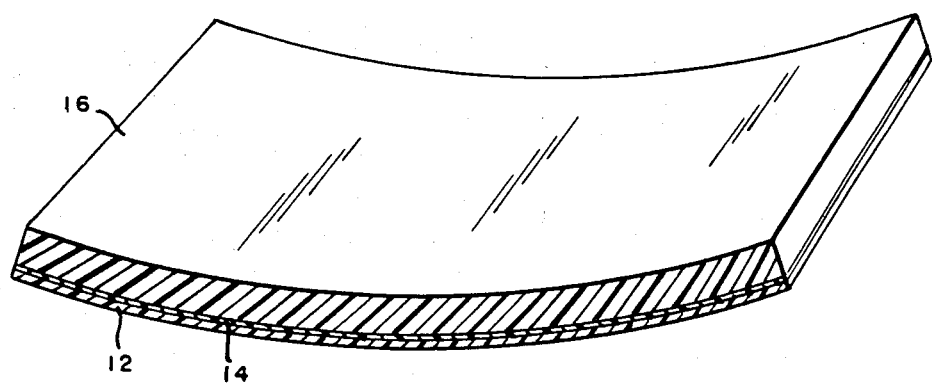
FIG. 3 is a sectional view partly in perspective of a laminated transparency that is separated from a shaped cell after the cell is shaped to a simple or compound bend and removed from the vacuum mold.

It is noted that the vacuum mold 33 of the first embodiment is depicted in FIGS. 1 to 3 as being composed of metal and the second embodiment is depicted in FIGS. 4 and 5 as being composed of fiber glass reinforced plastic. Either embodiment of mold may be composed of metal or fiber glass reinforced plastic such as a fiber glass reinforced epoxy resin.

It is also noted that the polyurethane foam base 26 of the FIGS. 1 to 3 embodiment is not shown in FIGS. 4 and 5. The use of such a foam is optional in the embodiment of FIGS. 4 and 5, particularly when the mold 33 is composed of metal.

The feasibility of forming plastic transparencies using hot recirculating fluid was first demonstrated by shaping a round disc 11 inches (28 centimeters) in diameter and 80 mils (2 millimeters) thick of polymethyl methacrylate (Plex II ®) over a semi-circular vacuum mold, using upper and lower sheets of silicone rubber 60 mils (1.5 millimeters) thick and 13 inch (33 centimeters) diameter to form cell with a rubber ring 0.5 inch (1.3 centimeters) thick surrounding the disc in spaced relation thereto and the space therebetween filled with a porous fiber glass filler. The vacuum mold had a peripheral ledge which supported the rubber ring and the marginal portion of the rubber sheets. A metal ring was superimposed over the marginal portion of the cell including the rubber ring and the marginal portion of the rubber sheets. The ring was clamped to the ledge to provide an air-tight chamber over the vacuum mold.

The vacuum mold had a port at its bottom portion. A hose connected the port to a cannister containing ethylene glycol at a level below the surface of a body of ethylene glycol. Another hose communicated air above the ethylene glycol to either a pressure source or a vacuum source at the discretion of the operator. Means was provided to control the temperature of the ethylene glycol stored in the cannister.

A tube extending through the rubber wall was connected to a source of vacuum to provide suction within the chamber or space filled with said porous fiber glass filler. This suction insured that the silicone rubber sheets were in intimate contact with the polymethyl methacrylate disc. The stored ethylene glycol was heated to approximately 200° F. (93° C.) and pumped into the mold to heat the disc. When the temperature of the disc reached its deformation temperature of 190° F. (88° C.), vacuum was applied to the cannister at 15 inches (38 centimeters) mercury vacuum level causing the ethylene glycol to gradually leave the mold, thereby permitting the disc to sag to the shape of the mold. The disc sagged readily.

In order to avoid having the lower sheet of silicone rubber separate from the lower surface of the polymethyl methacrylate sheet, relatively high vacuum was applied to the space between the outer rubber wall of the cell and the polymethyl methacrylate sheet simultaneously with the application of a lesser vacuum to the escape port at the lowermost portion of the vacuum mold.

Further experiments were performed with fluids having higher heat capacity than ethylene glycol, such as various high heat capacity oils. A most suitable heating fluid has been found to be IMS high heat transfer fluid HF-50 sold by IMS Company of Auburn, Ohio. This fluid is believed to be a linear polymer of ethylene and propylene oxide having the generalized formula:

$$RO-[CH_2CHO]_n[CH_2CH_2O]_m-OH$$

In further work on the second embodiment, the following cycle details were developed for rectangular assemblies comprising three plies of various materials and thicknesses enumerated in the following description of treatments for the lower mold chamber. In all cases, the upper mold chamber is continuously circulated with hot fluid until the mold lower chamber is emptied of fluid and develops a vacuum. Under these circumstances, a pressure slightly above atmospheric pressure due to the depth of the head of the heating fluid in the upper mold chamber and the pumping pressure on the fluid results. This additional pressure due to the fluid does not exceed 10 percent of standard atmospheric pressure.

For an assembly of an outer sheet of as cast acrylic (methyl methacrylate) 250 mils (6.35 millimeters) thick, a polyurethane interlayer 30 mils (0.76 millimeters) thick, and an inner sheet of polycarbonate 250 mils (6.35 millimeters) thick, the heating fluid is heated to and maintained at 305° F. (152° C.) and circulated for 60 minutes before evacuating the mold lower chamber. The shaped laminate that results is cooled to between room temperature and 100° F. (38° C.) by removing the hot fluid from the mold upper chamber before unclamping the flange from the ledge.

For an assembly comprising two sheets of polycarbonate each 250 mils (6.35 millimeters) thick and a polyurethane interlayer 30 mils (0.76 millimeters) thick, the heating fluid is heated to and maintained at a range of 305° to 315° F. (152° to 158° C.) and circulated for 75 minutes in the mold lower chamber. Then, the mold lower chamber is evacuated, the resulting shaped laminate is cooled, and the flange and ledge unclamped as previously described.

For an assembly comprising a sheet of as cast acrylic (polymethyl methacrylate) and a sheet of stretched acrylic (also polymethyl methacrylate), both sheets 250 mils (6.35 millimeters) thick and an interlayer 30 mils (0.76 millimeters) thick of polyvinyl butyral plasticized with dibutyl sebacate, the fluid is heated to and maintained at 210° F. (99° C.) and circulated for 60 minutes. Then, the mold lower chamber evacuation, shaped laminate cooling and unclamping steps described previously are performed.

In case the last assembly contains two sheets of stretched acrylic instead of one sheet of stretched arcylic and one sheet of as cast acrylic assembled with an identical interlayer sheet with all sheets having the same thickness dimensions as the previous assemblies, the temperature of the fluid is the same, but the time of hot fluid circulation is increased to 90 minutes. Otherwise, the cycle is identical as for the previous assembly.

It is noted in passing that the duration of exposure to heat is a function of the assembly thickness. It is noted that oven heating performed in the first embodiment required 4 hours to simultaneously shape and laminate an assembly 452 mils thick, whereas heating times of 60 to 90 minutes are sufficient in the embodiment using recirculating heating fluid for assemblies 530 mils thick.

The form of the invention show and described in this disclosure represents illustrative embodiments thereof. In the disclosed embodiments, a multiple ply assembly to be shaped and laminated simultaneously is enclosed within a flexible cell composed of air impervious elements that are either bonded or clamped togehter to form air tight boundaries between the elements. Means is provided to evacuate the volume within the cell including the interfaces between the plies. The cell and its contents are mounted in shaping relation over a vacuum mold of concave elevation and heated to the deformation temperature of the assembly, either within a heating oven or by exposing the upper and lower surfaces of the cell to hot circulating heating fluids. Evacuation of the vacuum mold helps sag the heat-softened assembly to the shape of the vacuum mold and enables the net downward pressure on the cell that results to laminate the heated assembly. The assembly is cooled to solidify its shape before its removal from the mold and transfer to a cutting template to develop the desired outline configuration for the bent laminated transparency that results from this invention.

The principles of the present invention have been used to simultaneously laminate and shape aircraft transparencies that have a compound bend about two axes of bending. It is understood that various changes may be made without departing from the gist of the invention as defined in the claimed subject matter which follows.

What is claimed is:

1. A method of simultaneously shaping and laminating a lightweight laminated transparency comprising elements including a pair of outer relatively rigid plies of acrylic or polycarbonate plastic and a flexible interlayer composed of a material selected from the group consisting of polyurethane and plasticized polyvinyl butyral comprising assembling at least one layer of said interlayer material between said pair of relatively rigid plies to form an assembly to be simultaneously shaped and laminated, supporting said assembly to be shaped and laminated on a base of a flexible, non-porous sheet larger in outline than said assembly in such a manner that said sheet forms the bottom wall of a cell and the perimeter of said assembly to be simultaneously shaped and laminated is in spaced relation within a flexible wall of air impervious material enclosing said cell, applying a flexible, non-porous sheet of air impervious material larger in outline than said assembly to the upper surface of said air impervious enclosing wall of said cell and against the upper surface of said assembly to form a roof for said cell, communicating said cell to a vacuum source to put said cell including the interfaces between the elements of said assembly within said cell under subatmospheric pressure, mounting said cell over a vacuum mold having an upward facing shaping surface of concave elevation conforming to the shape desired for said transparency including a vacuum opening so that said cell faces said vacuum opening and forms a collapsible chamber with said mold, supporting the portions of said flexible sheets of air impervious material extending beyond said assembly in fluid-tight relation to said wall enclosing said cell, heating said cell and said assembly while the latter are under vacuum to a deformation temperature of said assembly to sag said cell toward said upper shaping surface and applying vacuum through the vacuum opening of said mold while said cell is so heated and sealed to conform said cell to said shaping surface, the atmospheric pressure above said roof of said cell causing said layers of relatively rigid plastic to laminate to opposite sides of said interlayer while forcing said cell to conform to the shape of said shaping surface and the layers of said assembly within said cell to laminate at a maximum pressure less than ten percent above atmospheric pressure to convert said assembly to a bent laminated transparency, cooling said cell after it conforms to said shaping surface while maintaining said vacuum within said cell until said bent, laminated transparency within said cell retains its shape, separating said cell from said mold and separating said shaped, laminated transparency from said cell.

2. The method as in claim 1, wherein said assembly within said cell is subjected to a stronger vacuum through said enclosing wall than said collapsible chamber is subjected to.

3. The method as in claim 2, wherein said cell comprises an assembly of alternate relatively rigid plies of acrylic plastic and flexible interlayer material.

4. The method as in claim 2, wherein said assembly and cell are heated to a temperature of 210° F. ± 10° 1 F. (99° C. ± 6° C.).

5. The method as in claim 2, wherein said cell is subjected to a vacuum equivalent to a mercury column of about 28 to 29 inches (711 mm to 737 mm) and said collapsible chamber is subjected to a vacuum equivalent to a mercury column of about 5 to 10 inches (127 mm to 254 mm).

6. The method as in claim 2, wherein said assembly and flexible cell are heated to the deformation temperature of said assembly but below a temperature at which the plies become degraded with vacuum applied to said cell for at least one hour before vacuum is applied to said collapsible chamber between said vacuum mold and said lower flexible, non-porous sheet.

7. The method as in claim 2, wherein said assembly is supported on a horizontally disposed base of said cell comprising a sheet of deformable foam material and a film of parting material bonded to the upper surface of said sheet of deformable foam material and said flexible wall in air-tight relation to the peripheral portion of said flexible wall base.

8. The method as in claim 2, wherein said heating is accomplished using hot recirculating fluid.

9. The method as in claim 8, wherein said heating is accomplished by recirculating hot fluid in said collapsible chamber and also in a chamber above said cell until said assembly reaches deformation temperature, then removing hot fluid from said collapsible chamber until said cell conforms to said shaping surface, then cooling said assembly until its shape is set.

10. The method as in claim 2, further including providing the peripheral space between said wall and said assembly with a porous material that does not adhere to the elements of the assembly to be laminated under conditions of exposure during said method.

11. A method of simultaneously shaping and laminating a lightweight laminated transparency comprising elements including a pair of outer relatively rigid plies of acrylic or polycarbonate plastic and a flexible interlayer composed of a material selected from the group consisting of polyurethane and plasticized polyvinyl butyral comprising assembling at least one layer of said interlayer material between said pair of relatively rigid plies to form an assembly to be simultaneously shaped and laminated, supporting said assembly to be shaped and laminated on a base of a flexible, non-porous cell larger in outline than said assembly in such a manner that the perimeter of said assembly to be simultaneously shaped and laminated is in spaced relation within a flexible wall of air impervious material enclosing said cell, bonding a first flexible diaphragm of air impervious material to the upper surface of said air impervious wall of said cell to form a roof for said cell, communicating said cell to a vacuum source to put said cell including the interfaces between the elements of said assembly within said cell under subatmospheric pressure, mounting said cell over a vacuum mold having an upward facing shaping surface of concave elevation conforming to the shape desired for said transparency including a vacuum opening so that said cell faces said vacuum opening, applying a second flexible diaphragm of air impervious material extending beyond said first flexible diaphragm over said first flexible diaphragm, adhering the portion of said second flexible diaphragm that extends beyond the first flexible diaphragm to the surface of said mold in spaced relation to the periphery of said cell to form a collapsible chamber surrounding said cell, heating said cell and said assembly while the latter are under vacuum to a deformation temperature of said assembly to sag said cell toward said upper shaping surface and applying vacuum through the vacuum opening of said mold while said cell is so heated and sealed to conform said cell to said shaping surface, the atmospheric pressure above said second diaphragm causing said layers of relatively rigid plastic to laminate to opposite sides of said interlayer while forcing said cell to conform to the shape of said shaping surface, and the layers of said assembly within said cell to laminate at a pressure not exceeding atmospheric pressure to convert said assembly to a bent laminated transparency, cooling said cell after it conforms to said shaping surface while maintaining said vacuum within said cell until said bent, laminated transparency within said cell retains its shape, separating said cell from said mold and separating said shaped, laminated transparency from said cell.

12. The method as in claim 11, wherein said assembly within said cell is subjected to a stronger vacuum through said wall than said chamber between said second flexible diaphragm and said vacuum mold is subjected to.

13. The method as in claim 12, wherein said cell comprises an assembly of alternate relatively rigid plies of acrylic plastic and flexible interlayer material.

14. The method as in claim 12, wherein said assembly and cell are heated to a temperature of 210° F.±10° F. (99° C.±6° C.)

15. The method as in claim 12, wherein said cell is subjected to a vacuum equivalent to a mercury column of about 28 to 29 inches (711 mm to 737 mm) and said collapsible chamber is subjected to a vacuum equivalent to a mercury column of about 5 to 10 inches (127 mm to 254 mm).

16. The method as in claim 12, wherein said assembly and flexible cell are heated to the deformation temperature of said assembly but below a temperature at which the plies become degraded with vacuum applied to said cell for at least two hours before vacuum is applied to said collapsible chamber outside said cell.

17. The method as in claim 12, wherein said assembly is supported on a horizontally disposed base of said cell comprising a sheet of deformable foam material and a film of parting material bonded to the upper surface of said sheet of deformable foam material and said flexible wall is bonded to the peripheral portion of said flexible wall base.

18. The method as in claim 12, wherein said heating is accomplished using hot air within an oven.

19. The method as in claim 12, further including providing the peripheral space between said wall and said assembly with a porous material that does not adhere to the elements of the assembly to the laminated under conditions of exposure during said method.

* * * * *